United States Patent
Buarque de Macedo

(10) Patent No.: US 8,453,400 B2
(45) Date of Patent: Jun. 4, 2013

(54) PRESTRESSED, STRONG FOAM GLASS TILES

(76) Inventor: Pedro M. Buarque de Macedo, Bethesda, MD (US)

(*) Notice: Subject to any disclaimer, the term of this patent is extended or adjusted under 35 U.S.C. 154(b) by 1138 days.

(21) Appl. No.: 10/625,102

(22) Filed: Jul. 22, 2003

(65) Prior Publication Data

US 2005/0016093 A1    Jan. 27, 2005

(51) Int. Cl.
*E04C 5/08* (2006.01)
*C03C 3/076* (2006.01)
*C03C 11/00* (2006.01)

(52) U.S. Cl.
USPC .......................................... 52/223.7; 501/39

(58) Field of Classification Search
USPC ............ 52/223.1, 223.4, 223.5, 223.6, 223.7, 52/223.9, 223.14, 23, 284
See application file for complete search history.

(56) References Cited

U.S. PATENT DOCUMENTS

| | | | |
|---|---|---|---|
| 154,393 A | 8/1874 | Hill | |
| 299,598 A | 6/1884 | Totman | |
| 312,375 A | 2/1885 | Orr | |
| 545,984 A | 9/1895 | Smith | |
| 683,195 A | 9/1901 | Beam | |
| 1,529,895 A | 3/1925 | La Chance et al. | |
| 1,714,949 A | 5/1929 | Collier et al. | |
| 2,075,633 A | 3/1937 | Anderegg | |
| 2,281,524 A * | 4/1942 | Meyers | 359/593 |
| 2,466,613 A | 4/1949 | Richardson | |
| 2,620,597 A * | 12/1952 | Ford | 65/22 |
| 2,758,937 A * | 8/1956 | Ford | 501/39 |
| 2,991,591 A * | 7/1961 | Dennis et al. | 65/115 |
| 3,056,184 A * | 10/1962 | Blaha | 65/22 |
| 3,124,637 A * | 3/1964 | Heitzer | 356/35 |
| 3,186,816 A * | 6/1965 | Wartenberg | 65/116 |
| 3,269,887 A | 8/1966 | Windecker | |
| 3,273,833 A | 9/1966 | Windecker | |
| 3,292,316 A * | 12/1966 | Zeinetz | 52/81.4 |
| 3,321,414 A * | 5/1967 | Vieli | 521/188 |
| 3,325,341 A * | 6/1967 | Shannon | 428/406 |

(Continued)

FOREIGN PATENT DOCUMENTS

| | | |
|---|---|---|
| WO | 03016232 A1 | 2/2003 |
| WO | WO 2005/007989 A3 | 1/2005 |

OTHER PUBLICATIONS

Co-pending U.S. Appl. No. 10/076,971, filed Feb. 15, 2002.

(Continued)

*Primary Examiner* — Michael Safavi
(74) *Attorney, Agent, or Firm* — Amster Rothstein & Ebenstein LLP

(57) ABSTRACT

A prestressed, strong foam glass tile for use in construction. The prestressed, strong foam glass tiles of the present invention are capable of withstanding relatively large prestressing as a result of their relatively high compression strength. These prestressed, foam glass tiles will absorb and/or withstand more energy from an explosion, withstand higher heat and wind loading and other mechanical forces than traditional foam glass tiles. The foam glass tile of the present invention is strong enough that it can be prestressed over 1000 psi (lb./sq. in.), and more preferably over 2,000, 3,000, 4,000 and even more preferably over 5,000 psi. The prestressed, strong foam glass tiles of the present invention may be included as part of a prestressed assembly. Said prestressed assembly may be comprised of two metal members, one or more prestressed foam glass tiles, and a tension member such as a tension bolt and/or wires.

29 Claims, 3 Drawing Sheets

U.S. PATENT DOCUMENTS

| | | | |
|---|---|---|---|
| 3,328,229 A | 6/1967 | Windecker | |
| 3,396,922 A | 8/1968 | Windecker | |
| 3,396,923 A | 8/1968 | Windecker | |
| 3,416,756 A | 12/1968 | Windecker | |
| 3,427,689 A | 2/1969 | Windecker | |
| 3,430,397 A * | 3/1969 | Ellis | 52/223.7 |
| 3,448,546 A | 6/1969 | Windecker | |
| 3,459,565 A * | 8/1969 | Jones et al. | 501/39 |
| 3,467,345 A | 9/1969 | Windecker | |
| 3,493,460 A | 2/1970 | Windecker | |
| 3,518,156 A | 6/1970 | Windecker | |
| 3,519,228 A | 7/1970 | Windecker | |
| 3,533,880 A | 10/1970 | Windecker | |
| 3,537,220 A | 11/1970 | Ellis | |
| 3,549,449 A | 12/1970 | Windecker | |
| 3,559,361 A | 2/1971 | Sarros | |
| 3,592,619 A * | 7/1971 | Elmer et al. | 501/39 |
| 3,607,595 A | 9/1971 | Windecker | |
| 3,614,967 A | 10/1971 | Royston | |
| 3,666,850 A | 5/1972 | Windecker | |
| 3,674,585 A | 7/1972 | Windecker | |
| 3,712,010 A | 1/1973 | Porter et al. | |
| 3,811,851 A * | 5/1974 | MacKenzie | 65/22 |
| 3,848,335 A | 11/1974 | Bergersen | |
| 3,951,632 A | 4/1976 | Seki et al. | |
| 3,959,541 A | 5/1976 | King et al. | |
| 3,979,217 A | 9/1976 | Sutton | |
| 3,986,311 A | 10/1976 | Muhe et al. | |
| 4,024,309 A | 5/1977 | Pender | |
| 4,051,296 A | 9/1977 | Windecker | |
| 4,058,943 A * | 11/1977 | Sturgill | 52/223.7 |
| 4,119,422 A | 10/1978 | Rostoker | |
| 4,119,583 A | 10/1978 | Filip et al. | |
| 4,124,365 A * | 11/1978 | Williams et al. | 65/22 |
| 4,178,162 A * | 12/1979 | Shono et al. | 65/496 |
| 4,196,251 A | 4/1980 | Windecker | |
| 4,198,224 A | 4/1980 | Kirkpatrick | |
| 4,232,069 A | 11/1980 | Windecker | |
| 4,259,118 A * | 3/1981 | Sack | 501/66 |
| 4,283,457 A | 8/1981 | Kolsky et al. | |
| 4,324,037 A * | 4/1982 | Grady, II | 29/469 |
| 4,332,907 A * | 6/1982 | Vieli | 501/39 |
| 4,332,908 A * | 6/1982 | Vieli | 501/39 |
| 4,347,326 A | 8/1982 | Iwami et al. | |
| 4,424,280 A | 1/1984 | Malric | |
| 4,430,108 A * | 2/1984 | Hojaji et al. | 65/22 |
| 4,432,172 A | 2/1984 | Kuykendall et al. | |
| 4,440,296 A | 4/1984 | Howe et al. | |
| 4,450,656 A * | 5/1984 | Lagendijk | 52/63 |
| 4,571,321 A | 2/1986 | Kijowski et al. | |
| 4,595,710 A | 6/1986 | Albertelli et al. | |
| 4,623,585 A | 11/1986 | Linton et al. | |
| 4,628,652 A * | 12/1986 | Wefels | 52/306 |
| 4,694,622 A | 9/1987 | Richard | |
| 4,710,415 A | 12/1987 | Slosberg et al. | |
| 4,758,538 A | 7/1988 | Satoh et al. | |
| 4,798,758 A | 1/1989 | Nagano et al. | |
| 4,833,015 A | 5/1989 | Furuuchi et al. | |
| 4,875,314 A | 10/1989 | Boilen | |
| 4,879,159 A | 11/1989 | Furuuchi | |
| 4,903,446 A * | 2/1990 | Richards et al. | 52/223.6 |
| 4,953,332 A | 9/1990 | Galloway | |
| 4,987,028 A | 1/1991 | Kandachi et al. | |
| 4,990,398 A | 2/1991 | Fukumoto et al. | |
| 4,992,321 A | 2/1991 | Kandachi et al. | |
| 4,999,959 A | 3/1991 | Virtanen | |
| 5,069,960 A | 12/1991 | Fukumoto et al. | |
| 5,097,558 A | 3/1992 | Accorsi et al. | |
| 5,151,228 A | 9/1992 | Vahlbrauk | |
| 5,188,649 A | 2/1993 | Macedo et al. | |
| 5,231,811 A | 8/1993 | Andrepont et al. | |
| 5,451,465 A | 9/1995 | Garrioch | |
| 5,476,692 A * | 12/1995 | Ellis et al. | 427/558 |
| 5,514,198 A | 5/1996 | Bayle et al. | |
| 5,516,351 A | 5/1996 | Solomon et al. | |
| 5,588,977 A | 12/1996 | Pavlov et al. | |
| 5,641,815 A | 6/1997 | Fehlmann | |
| 5,763,341 A | 6/1998 | Pavlov et al. | |
| 5,809,713 A | 9/1998 | Ray | |
| 5,821,184 A | 10/1998 | Haines et al. | |
| 5,862,640 A | 1/1999 | Negri | |
| 5,881,514 A | 3/1999 | Pryor | |
| 6,042,905 A | 3/2000 | Lingart et al. | |
| 6,082,063 A | 7/2000 | Shrive et al. | |
| 6,133,172 A | 10/2000 | Sevenish et al. | |
| 6,174,587 B1 | 1/2001 | Figge, Sr. | |
| 6,195,949 B1 | 3/2001 | Schuyler | |
| 6,207,236 B1 | 3/2001 | Araki et al. | |
| 6,212,840 B1 | 4/2001 | Davidovitz | |
| 6,468,613 B1 | 10/2002 | Kitano et al. | |
| 6,721,684 B1 | 4/2004 | Saebi | |
| 6,964,809 B2 | 11/2005 | Hojaji et al. | |
| 6,967,051 B1 | 11/2005 | Augustynowicz et al. | |
| 2001/0018836 A1 * | 9/2001 | Schmidt et al. | 65/94 |
| 2002/0010223 A1 | 1/2002 | Botrie | |
| 2003/0134920 A1 * | 7/2003 | Poisl et al. | 521/59 |
| 2003/0145534 A1 | 8/2003 | Hojaji et al. | |
| 2003/0167711 A1 | 9/2003 | Lstiburek | |
| 2004/0071960 A1 * | 4/2004 | Weber et al. | 428/336 |
| 2004/0079260 A1 | 4/2004 | Datta et al. | |
| 2004/0080063 A1 | 4/2004 | Datta et al. | |
| 2004/0081827 A1 | 4/2004 | Datta et al. | |
| 2004/0123535 A1 | 7/2004 | Hojaji et al. | |
| 2004/0262801 A1 | 12/2004 | Hojaji et al. | |
| 2005/0016093 A1 | 1/2005 | Buarque de Macedo | |
| 2005/0019542 A1 | 1/2005 | Hojaji et al. | |

OTHER PUBLICATIONS

Written Opinion of ISA for PCT/US04/023030 (mailed Jun. 27, 2006), Macedo.
U.S. Appl. No. 11/273,785, Hojaji, et al.
U.S. Appl. No. 10/625,071, Hojaji, et al.
U.S. Appl. No. 10/736,796, Hojaji, et al.
U.S. Appl. No. 11/607,412, Macedo.
U.S. Appl. No. 11/728,667, Hojaji, et al.
McGraw Hill Dictionary of Scientific and Technical Terms, 5th ed., 1994 pp. 785 and 904, McGraw Hill, Inc., New York, U.S.A.
Glass Online, Illustrated Glass Dictionary, at http://www.glasonline.com/infoserv/dictionary/39.html.
Pittsburgh Corning Foamglas Insulation, 2004, Pittsburgh Corning Corporation.
Edward G. Nawy, "Prestressed Concrete: A Fundamental Approach," 1989, pp. 8-13, Prentice-Hall, Inc., Englewood Cliffs, New Jersey.
Forest Products Laboratory Wood Plastics, Nov. 1941, U.S. Dept. of Agriculture, Madison, Wisconsin.
J.A. Newlin and G.W. Trayer, Stresses in Wood Members Subjected to Combined Column and Beam Action, Mar. 1956, U.S. Dept. of Agriculture, Madison, Wisconsin.
Communication pursuant to Article 94(3) EPC dated Oct. 18, 2011.

* cited by examiner

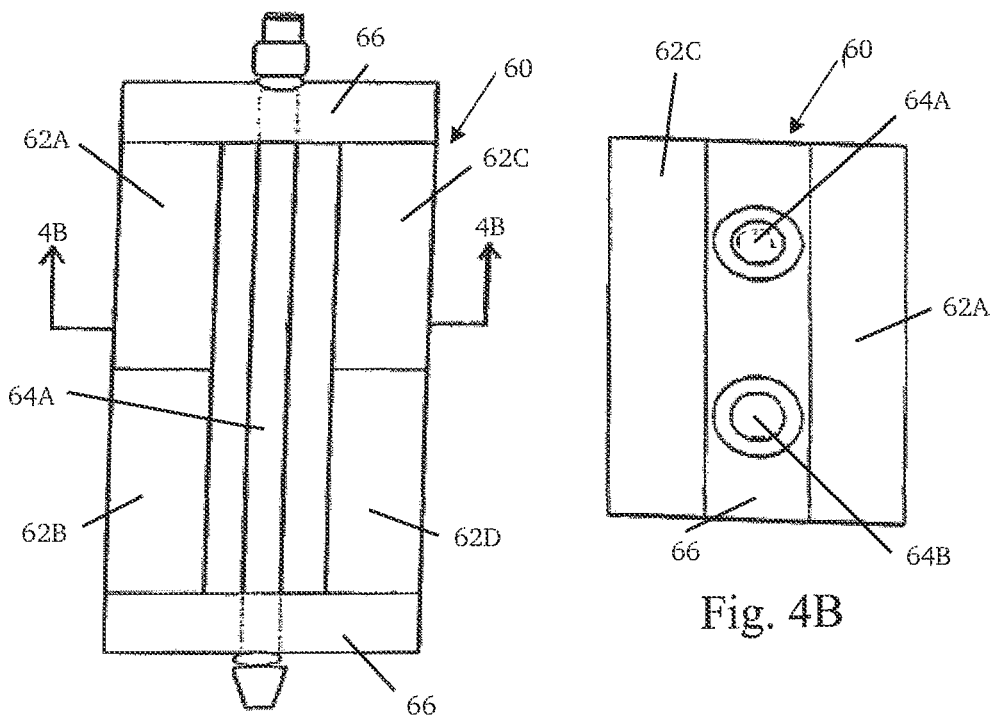
Fig. 4A
Fig. 4B
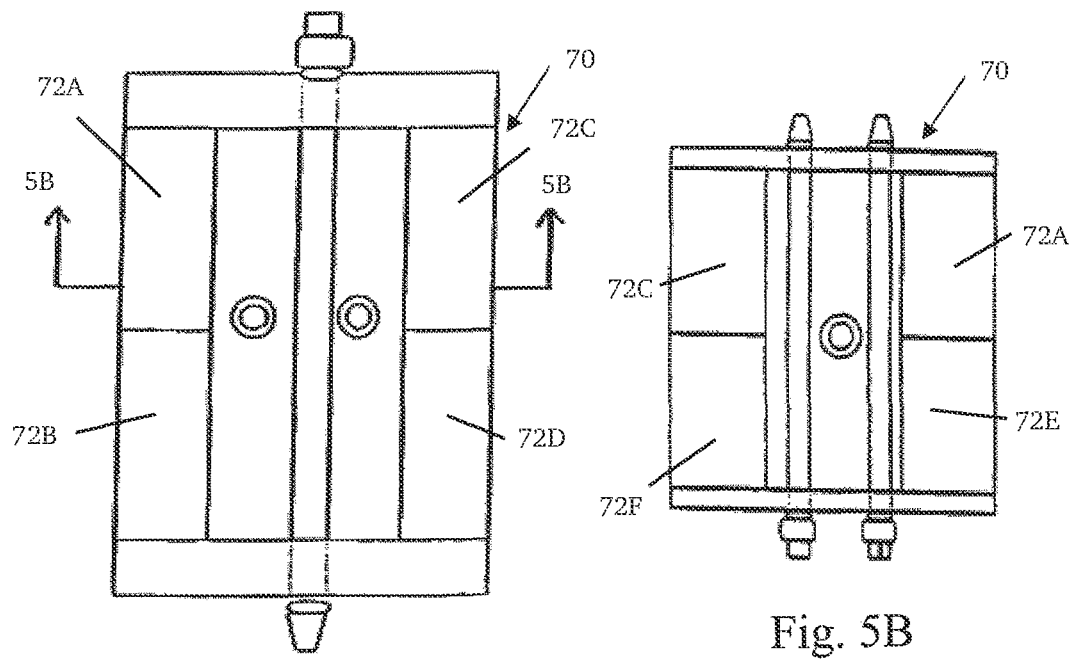
Fig. 5A
Fig. 5B

PRESTRESSED, STRONG FOAM GLASS TILES

FIELD OF THE INVENTION

The present invention relates generally to a building material to be used in building construction. More particularly, the present invention relates to prestressed, strong foam glass tiles, which are to be used in building construction and other purposes and assemblies made therefrom.

BACKGROUND OF THE INVENTION

Over the past decades, there have been a significant number of terrorists attacks on government buildings owned by the United States and other countries both outside of the United States and within. For example, in 1993, terrorists exploded a car bomb inside the garage of the World Trade Center located in New York City, resulting in loss of life and significant property damage. Since then, in 1995, other extremists exploded a truck outside of the Federal Building located in Oklahoma City, Okla. also resulting in significant loss of life and property damage. In 1998, the United States embassies in Nairobi and Dar Es Salaam were also subject to terrorists attacks by car bombs, each of which resulted in significant loss of life and property damages. More recently, the tragic events at the World Trade Center in New York City and the Pentagon in Virginia has further emphasized the long felt need to develop and manufacture building materials which are able to withstand the shock wave from car bomb explosions and other similar terrorist attacks.

Traditionally, the support structures for many buildings are made from reinforced concrete. In some instances, when stronger materials are desired, prestressed concrete has been used. For example, prestressed concrete has been used in buildings, underground structures, TV towers, floating storage and offshore structures, power stations, nuclear reactor vessels and numerous types of bridge systems including segmental and cable-stayed bridges. Prestressed concrete has been considered advantageous over reinforced concrete in instances where a shallower depth for the same span and loading conditions is desired. Prestressed concrete has also been considered advantageous over reinforced concrete where a lighter weight material is desired. Prestressed concrete also requires less concrete, and less reinforcement due to its added strength. Unfortunately, prestressing operations themselves results in added costs: formwork is more complex, since the geometry of prestressed sections is usually composed of flanged sections with thin webs. Thus, it would be desirable to have a building material which obtains the added strength of prestressed concrete, but were to weigh less and thus require less support structure. Lighter support structures have the ability to increase useable space within the same footprint, and/or increase the number of floors that can be supported, and/or withstand greater impact forces, such as caused by earthquakes. Typically, prestressed concrete will contain water, either as a result of its manufacturing process or due to water migrating from outside the concrete. As a result of the presence of such water, the tension members that prestress the concrete, usually made of steel or other corrosive metals, may rust and thus weaken the structure. Further, as a result of the presence of such water, when the prestressed concrete is exposed to typical heat/thaw cycles it can crack. Also, as a result of the presence of such water, in the case of fire, the prestressed concrete is subject to failure as a result of steam formation. Another drawback to using prestressed concrete is that it has a limited variety of aesthetic appearances.

While the concept of using foam glass as a construction material is well known in the prior art, generally such foam glass has been used as a high temperature insulator and thus seeks to minimize its density and weight and is not suitable for absorbing sufficient energy from a shock wave from unexpected explosions or to resist an earthquake and/or wind and heat loading. The shortcomings in such conventional foam glass as relevant to this long standing problem is now described.

For example, Pittsburgh Corning Corporation ("PCC") of Pittsburgh, Pa. has developed and marketed a product known as Foam Glas® Insulation Systems, which is described in U.S. Pat. Nos. 3,959,541, 4,119,422, 4,198,224, 4,571,321 and 4,623,585. Because the focus of these developments are directed to making a foam insulating material, the Foam Glas® Insulation Systems tile commercially sold by PCC is relatively light, weighing 9.5 lb./cu. ft. Furthermore, since the purpose of this tile is to be used as thermal insulation, it lacks surface strength, and can be dented very easily. Because the Foam Glas® Insulation Systems tile is of relatively low density, e.g., 9.5 lb./cu. ft., such tiles will easily break when exposed to forces typically exerted on exterior walls of a building or other structure. Thus, such tiles are not suitable to be used as tiling for an exterior wall. Similarly, this foam, when exposed to a shock wave from an explosion will absorb very little of the shock waves energy when it implodes. A shock wave is a measure associated with explosions which is easily understood by those skilled in the art as being a pressure front resulting from an explosion.

Others have also attempted to use foam glass tiles as the outer skin-surface of buildings. For example, U.S. Pat. No. 5,069,960 discloses a thermally insulating foam glass tile that is coated with an outside surface to make a hard skin to protect the outside of a building. The tiles disclosed are fabricated in extremely small sizes, i.e., 18 cm×18 cm×6 cm, and the interior foam material which makes up the bulk of the material is generally of a low density. Significantly, there is no indication that the strength of the material disclosed is capable of absorbing sufficient energy from an explosion, and indeed the size of the disclosed tiles would not be ideally suitable for absorbing such energy. Furthermore, there is no indication that small size pores are being used.

Prior work by the inventors and others have developed methods for making foam glass tiles of a wide a variety of densities as described in U.S. Pat. No. 4,430,108 that can be used for building materials. While the techniques and methods disclosed were useful to manufacture then-standard size tiles of 4.25 in.×4.25 in.×0.25 in., this disclosure does not teach how to manufacture tiles of a larger size, for example 2 ft.×2 ft.×3 in. Likewise the tiles manufactured under these methods were relatively light, e.g., less than 10 lbs., and were not manufactured to withstand the effects of an explosion. To the contrary, these methods sought to optimize the thermal insulation properties of the material, and thus made smaller, lighter and weaker tiles.

While still others have worked on trying to make some large-size porous shaped bodies, these have been smaller in critical dimensions and of lower density than the present invention and not suitable to absorb a substantial amount of a shock wave which impacts the bodies associated with an explosion or earthquake. For example, U.S. Pat. No. 5,151,228 describes a process for manufacturing large-size porous shaped bodies of low density by swelling, in order to manufacture large-size cellular ceramic structural elements, e.g., multi-story high wall elements having a low weight. In the example, it discloses a tile 8.2 ft.×1.64 ft.×2 in., with a density of 26 lb./cu. ft. and a mass of 60 lbs. It also teaches to obtain a low density in order to optimize thermal insulation. Thus, this foam when exposed to a shock wave from an explosion or earthquake or heat or wind loading or stress of any kind will absorb very little of the shock waves energy when it implodes.

Further, others, such as Central Glass Co. Ltd., of Ube, Japan, have attempted to make foam glass using densities in the range of 0.3 to 0.6 g/cu. cm (or 18.7 to 37.4 lb./cu. ft.) as disclosed in U.S. Pat. No. 4,798,758. The '758 patent explains that in order to make the foam glass stronger, an outer layer is also added which has a density in the range of 0.8 to 1.7 g/cu. cm and a thickness of 1.5 to 20 mm. In the examples shown, all the samples which are over 30 lbs. in weight were found to be unacceptable from a cutability and impact resistance perspective, for among other reasons that the surface had appreciable breaking and sometimes cracking, thus not providing a closed pore surface. Further, U.S. Pat. No. 4,833,015, a later patent by Central Glass Co. Ltd., explains the tensile strength perpendicular to the surface of the tile described in the '758 patent was very poor, i.e., below 150 lb./sq. in., thus making it unsuitable for purposes of the present invention. Even after putting a third layer to improve the strength of the product as described in the '015 patent, the best tensile strength achieved was below 200 lb./sq. in., and making it unsuitable for purposes of the present invention.

Other efforts by Central Glass Co., Ltd. attempt to make higher density glass tiles, such as U.S. Pat. No. 4,992,321. However, these tiles do not appear to be a closed pore structure and there is no indication as to their strength. Indeed, filler materials are used in an attempt to increase the strength with no reporting data. Further, the tiles disclosed were also very thin, 33 mm (or 1.3 in.).

Still others have attempted to make foam glass tiles with smaller pore size. For example, in U.S. Pat. No. 5,516,351, the relationship of pore size to thermal resistivity is shown in which the best pore size is always greater than 1.0 mm. Similarly, the density is always less than 12 lb./cu. ft. Other efforts to use small pore size and larger densities, such as U.S. Pat. Nos. 3,951,632 and 4,758,538, failed to achieve comparable strengths and does not disclose achieving a closed pore outer skin as disclosed by the present invention.

In the past, although some have made tempered glass, such as used in windshields, no one has successfully made prestressed foam glass tiles, like the present invention. Similarly, while it has been suggested in U.S. Pat. No. 4,024,309, to prestress foam glass slabs, the methods disclosed to achieve such prestressing are inoperable. Specifically, the '309 patent discloses a process whereby outer metal sheets are to be placed in tension by stretching while foam glass is formed therebetween. Unfortunately, the temperatures at which such foam glass is formed will cause the outer metal sheets which are in contact therewith to stretch and thereby releasing the intended tension. As such, the process disclosed would be inoperable. Further, the method disclosed in the '309 patent utilizes water cooling of the foam glass, which will cause the outer edge to go through the glass transition before the interior portion, thus causing the interior portion to shrink due to the higher thermal expansion coefficient of the liquid center as compared to the solid exterior, which will cause the final product to be in tension in the center rather than in compression as desired. Thus, even if the resulting product does not break from such tensions, the desired prestressing would be the opposite as desired, making the final product very weak at best.

Unlike the prior art discussed above, the tiles of the present invention are designed and constructed of various materials so that such tiles have properties which are ideal for withstanding the shock wave associated with large explosions or make a building or other structure resistant to earthquakes and other shock waves.

Thus, while the prior art is of interest, the known methods and apparatus of the prior art present several limitations which the present invention seeks to overcome. In particular, it is an object of the present invention to provide a prestressed, strong foam glass tile which can be used as a building material or otherwise.

It is another object of the present invention to provide a prestressed, strong foam glass tile that is lighter than prestressed concrete.

It is another object of the present invention to provide a prestressed, strong foam glass tile that is stronger than prestressed concrete.

It is a further object of the present invention to provide a prestressed, strong foam glass tile that can withstand higher temperatures than prestressed concrete.

It is a further object of the present invention to provide a prestressed, strong foam glass tile that allows substantially less water penetration than prestressed concrete, so as to protect the support members and to prevent cracking due to freeze/thaw cycles, and to prevent steam explosions inside the concrete in case of fire.

It is a further object of the present invention to provide a prestressed, strong foam glass tile which can be used on the critical surfaces of buildings at high risk for terrorist attacks, in combination with cement, steel or other building materials.

It is a further object of the present invention to provide a prestressed, strong foam glass tile which can come in a variety of aesthetic appearances.

These and other objects will become apparent from the foregoing description.

SUMMARY OF THE INVENTION

It has now been found that the above and related objects of the present invention are obtained in the form of a prestressed, strong foam glass tile for use in construction. The prestressed, strong foam glass tiles of the present invention are capable of withstanding relatively large prestressing as a result of their relatively high compression strength. These prestressed, foam glass tiles will absorb and/or withstand more energy from an explosion than other foam glass tiles, withstand higher heat and wind loading and other mechanical forces. The foam glass tile of the present invention is strong enough that it can be prestressed over 1000 psi (lb./sq. in.), and more preferably over 2,000, 3,000, 4,000 and even more preferably over 5,000 psi.

In another embodiment of the present invention, the prestressed, strong foam glass tiles of the present invention may be included as part of a prestressed assembly for use in buildings or other structures. Said prestressed assembly may be comprised of: at least one prestressed foam glass tile, having a prestressed compression of 1000 psi or greater; at least two metal beams; and one or more tension members; wherein said at least one foam glass tile is placed between said at least two metal beams and held in compression by said one or more tension members at least 1000 psi. Alternatively, the prestress compression of said at least one prestressed foam glass tile is 2000 psi or greater, and preferably is 3000 psi or greater, and more preferably 4000 psi or greater, and even more preferably, is 5000 psi or greater. Alternatively, the metal members may be inside of said tiles, partially inside said tiles, and/or outside of said tiles. The prestressed foam glass tile of the present invention may also be under compression by a portion of the weight of a building. The prestressed assembly may be a column in a building. The metal beams may be comprised of steel or any other suitable metal. The tension members may be comprised of tension bolts, wire, carbon fibers, standard and/or compact seven-wire prestressing strands, a rod, an angle iron, a plate, a bar and/or other devices well known in the art for causing compression of prestressed concrete. The metal beams may be cambered prior to assembly to account for stress which will be applied upon assembly. Alternatively, said assembly may further comprise two metal pieces with beveled edges which are placed between said at least one foam glass tile and each of the metal beams. Said at least one foam glass tile may be comprised of one or more columns of prestressed foam glass tiles, and/or one or more rows of prestressed foam glass tiles. Said at least one foam glass tile may further be comprised of two sets of foam glass tiles and said tension member is located between said two sets of foam glass tiles.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIG. 4A shows a cross-sectional view of another embodiment of the present invention where two sets of foam glass tiles are under compression with tension bolts in between;

FIG. 4B shows a cross-sectional view taken along line 4B-4B of FIG. 4A;

FIG. 5A shows a cross-sectional view of another embodiment of the present invention where two sets of foam glass tiles are under compression in two directions with tension bolts in between;

FIG. 5B shows a cross-sectional view taken along line 5B-5B of FIG. 5A;

DETAILED DESCRIPTION OF THE INVENTION

Figure 1:
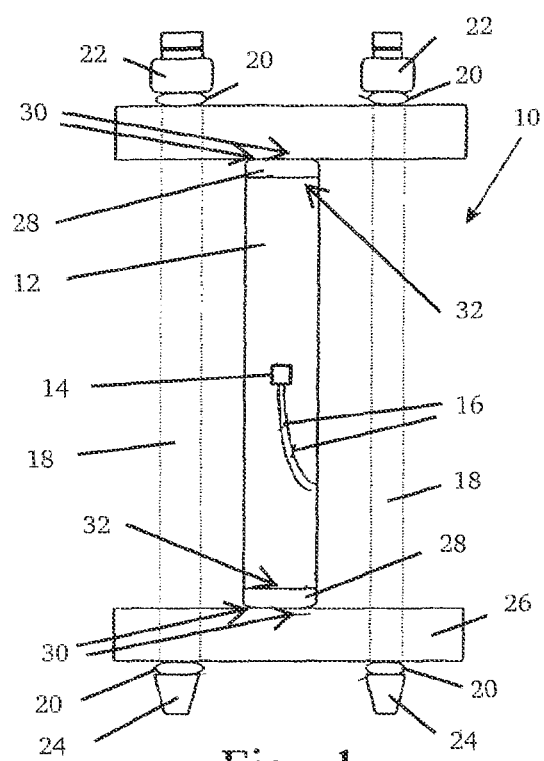
FIG. 1 shows a side view of an embodiment of the present invention with one prestressed foam glass tile under compression with tension bolts outside the tile.

The present invention relates to prestressed, strong foam glass tiles which can be used as building materials and otherwise. The present invention may be used on the critical surfaces of buildings at high risk for terrorist attacks, in combination with cement, steel or other building materials. The present invention may also be used on surfaces of typical buildings and/or as structural support members of such buildings. The present invention may be used in lieu of reinforced concrete and/or prestressed concrete in any application including but not limited to buildings, underground structures, TV towers, floating storage and offshore structures, power stations, nuclear reactor vessels and numerous types of bridge systems including segmental and cable-stayed bridges. The present invention has the advantages of being more resistant to earthquakes and/or wind and heat loading.

In co-pending U.S. patent application Ser. No. 10/625,071 ("the '071 Application," published as U.S. Patent Application Publication No. US 2005/0019542 A1), which is owned by the same applicant and was filed on the same day as this application, and the content of which is incorporated by reference herein, a strong, high density foam glass tile having small pore sizes is disclosed which have tension strength ranging from 775 to 2500 lb./sq. in. and compression strength ranging from 2000 to 14,600 lb./sq. in. This previously unattainable strength in foam glass tiles, now makes it possible to apply the technology associated with prestressed concrete to prestressed foam glass tiles. The present invention is directed at this new and heretofore not possible application. Details on how to manufacture such tiles are disclosed in that application.

There are many possible methods to fabricate ceramic foam panels with various densities, sizes, and surface finishes. U.S. Pat. No. 4,430,108 describes various foam glass products fabricated from fly ash and other additives with various densities, and surface finishes, the disclosure of which is incorporated by reference herein. Similarly, co-pending application Ser. No. 10/076,971, filed on Feb. 15, 2002 by the same assignee, also discloses additional processes useful in manufacturing the present invention, the disclosure of which is incorporated by reference herein. Foam glass with various densities can be fabricated by varying the composition and type and concentration of cellulating agents. Viscosity of glass is the dominating parameter during the foaming process. In addition, the pore structure and its uniformity are dependent on the distribution and particle size of the cellulating agent.

In another embodiment of the present invention, the foam glass tile preferably has a closed pore outer skin, which thus provides the tile with increased strength and protects the tile against water, and the freeze, thaw cycle. The closed pore outer skin may either be formed naturally as taught in U.S. Pat. No. 4,430,108 or mechanically by bonding a secondary glass surface as taught in U.S. Pat. No. 5,069,960, the contents of which are incorporated by reference herein. Alternatively, the closed pore outer skin may be formed in accordance to the teachings of U.S. Pat. No. 4,833,015, the contents of which are incorporated by reference herein. Natural formation is advantageous because it does not require additional labor and quality control, and thus is more cost effective and less burdensome. Using a secondary glass surface may also be advantageous because such techniques allow the closed pore outer skin to have various color and texture variations which will make the tile architecturally attractive for use as an exterior or interior facade of a building or other structure. One way of making different color surfaces is by the use of different color additives, as is generally well known to those skilled in the art.

Another advantage of the high density foam glass tile of the present invention is that when it is exposed to a blast shock wave it is capable of absorbing a substantial portion of the shock wave. Because these tiles are capable of absorbing a substantial portion of a blast shock wave, they are particularly advantageous as building construction materials for interior and exterior surfaces of buildings which are at risk of exposure to explosions, such as government buildings, embassies and high visibility/famous buildings.

The selection of the particular size, thickness and density of the foam glass tile depends upon the use to which the tile is intended to be made. For example, if the tile is intended to be used to resist earthquakes, then the tiles should be optimized to be the lowest weight that can withstand the wind pressure. By contrast, if the tile is intended to protect a building or structure from shock waves associated with an explosion, then the tile should be optimized to increase its density and decrease its pore size to be strong enough to withstand such a shock wave or vis-versa to absorb such a shock wave. The desired thickness will depend upon the proximity of the exposed tile to the location of the potential explosion. For example, on the outside of a building, the thickness would have to take into account the distance of the tile to the nearest location where an automobile or truck with explosives may be parked. On the other hand, in an interior of a building, such as a support column, the proximity anticipated could be immediately next to such a column, although the likely anticipated explosive load would be substantially less.

For aesthetic purposes, the tiles with a finished layer can be used on any surface subject to public view. Thus, if only one surface will be exposed to public view, than only that surface needs to have the tiles with a finished layer. On the other hand, if both sides of a wall sought to be protected by the present invention are subject to a public view, than a second tile with an appropriate finished layer can be used on the second exposed side, such as the interior of the building. Alternatively, other interior surfaces can also be used.

Another advantage of the tiles of the present invention is that such tiles are also heat insulating as well as fire proof. Thus, these tiles have an added advantage of being able to be used to protect a support column from a terrorist fire attack such as a Moltov cocktail, or other sources of fire. The use of the tiles of the present invention can thereby either prevent and/or delay the destruction of such support columns, thereby increasing the likelihood that occupants of an attacked building will have sufficient time to evacuate.

In the preferred embodiment, the tile of the present invention can be manufactured using raw materials which include (but are not necessarily limited to) silica, fly ash, volcanic ash, diatomaceous earth, siliceous minerals, alkali carbonates, calcium and magnesium minerals such as dolomite, and gypsum, sodium silicate, borax, glass powders (such as cullet) and foaming agents. The foaming agent can be selected from carbonaceous organics such as sugar and starch, carbon black, silicon carbide, carbonates, sulfates and other like materials.

In an alternative embodiment of the present invention, the foam glass tiles may be reinforced by using a metal netting, metal wires or alternative support structures as described in U.S. Pat. Nos. 4,798,758, 4,833,015, 4,987,028, and 4,992,321, the contents of which are incorporated herein by reference. While on the one hand, these additional materials may help strengthen the resulting foam glass tile, on the other hand, they also can make it more difficult to cut.

Under one embodiment of the present invention shown in FIG. 1, a prestressed assembly 10 is shown. The prestressed assembly 10 is comprised of a prestressed, strong foam glass tile 12, two steel beams 26, two steel pieces 28, and two tension bolts 18 with associated nuts 22 and washers 20. The prestressed, strong foam glass tile 12 is formed in accordance with the teachings of the co-pending U.S. patent application owned by the same applicant discussed above which was filed on the same day as the present application, with strain gauges 14 attached on each of the four sides of foam glass tile 12, and wires 16 coming out of the strain gauges 14 and connected to a strain measuring machine (not shown). In this embodiment, the strain gauges 14 should be placed approximately at the center of the 4 side walls of tile 12. The top and bottom surfaces 32 of tile 12 should be ground to be smooth and parallel, to avoid uneven application of stress to tile 12. Two steel pieces 28 are placed adjacent to the top and bottom surfaces 32 of tile 12. Two steel beams 26 are in turn placed on the outer surfaces of steel pieces 28. The steel beams may also be replaced with other appropriately strong and stiff building materials. The two steel beams 26 are bolted together by two tension bolts 18 having bolt heads 24 and associated nuts 22 and washers 20, with the steel pieces 28 and foam glass tile 12 in between. Alternatively, instead of using nuts, it may be deemed desirable to weld or otherwise fasten the tension bolts in a manner known by those skilled in the art. Each of the steel pieces 28 includes beveled edges 30 on the side thereof away from tile 12 and adjacent steel beam 26. When the nuts 22 and bolts 24 are tightened to apply pressure to steel beams 26, the beams 26 will bend. In order to avoid transmitting an unequal stress to the foam glass tiles 12, steel pieces 28 are provided with beveled edges 30 so as to permit steel beam 26 to flex when nuts 22 are tightened and to avoid transmitting the curvature of steel beam 26 to tile 12. Alternatively, the steel beams 26 may be built with appropriate camber so as to avoid the necessity of providing beveled edges 30 on steel pieces 28, and possibly steel pieces 28 altogether. Screws 18 having bolt heads 24 and nuts 22 should be selected to have sufficient strength to apply the required prestressing for the selected foam glass tile 12.

In order to insure that the strain is applied evenly, the strain measured by strain gauges 14 is monitored. Specifically, the strain gauges 14 on the side walls of tile 12 that are adjacent tension bolts 18 should be monitored to insure that stress is applied equally. For example, the nuts 22 should be tightened while bolt heads 24 are held fixed in a manner so as to maintain the stress gauges 14 approximately even although not necessarily exactly the same. Significantly, until an appropriate tightening protocol is developed for a particular configuration, it is useful to have strain gauges located near each tension bolt to ensure even tightening.

Figure 2:
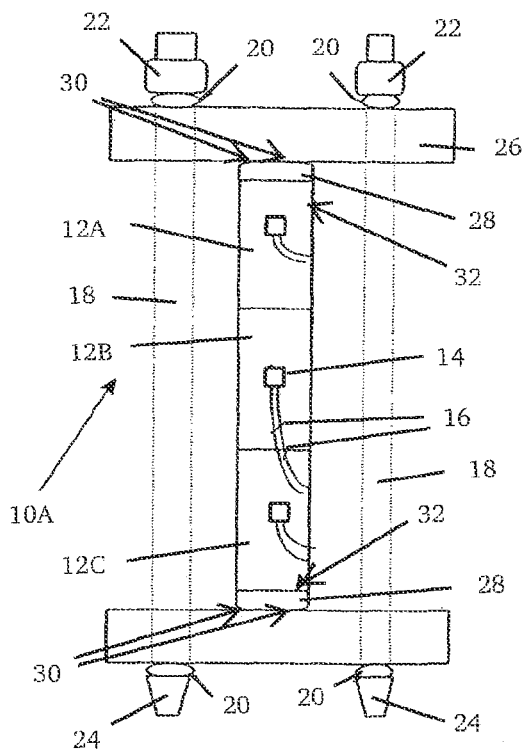
FIG. 2 shows a side view of an embodiment of the present invention with three prestressed foam glass tiles under compression with tension bolts outside the tiles.

In FIG. 2, another embodiment of the present invention is shown. Here, the prestressed assembly 10A is comprised of the same elements as the prestressed assembly 10 shown in FIG. 1, except that there are multiple prestressed, strong foam glass tiles 12A, 12B, 12C between the steel beams 26/steel pieces 28. While three tiles are shown in FIG. 2, the number of tiles could vary depending upon the size of the tiles and height of the floor. For example, if tiles of 2 feet×2 feet×some thickness are used, and the distance between floors is 10 feet, as is commonly the case in many buildings, then 5 tiles would be used instead of three as shown in FIG. 2. Similarly, in the case where the distance between floors is 12 feet, then 6 tiles of the same dimensions would be used. However, even if the distances between floors do not match an even multiple of the tile height, the tiles of the present invention can be cut to size, as long as the top and bottom surfaces remain even, such as by grounding and/or polishing as discussed with respect to FIG. 1, above or some alternatively equivalent method of evening out. Further, between the foam glass tiles the surface should be provided to be smooth or even.

It is also possible to join the foam glass tile with other solid layers via a joining compound. For instance, appropriate contact adhesives can be applied between a sheet of metal and foam glass. One such adhesive that can be used with aluminum sheets is a silicone based adhesive. Other examples are application of a polymeric foam between the foam glass and another backing material to protect the polymeric foam. Polyurethane foam and cement board are examples of this type of multilayer backing. The advantage of polyurethane foam is that, it can be applied in place into a gap between a pre-positioned foam glass board and a sheathing back layer. Polymeric backing are particularly useful to reduce fragmentation of the brittle layers such as foam glass and more so of the cementaceous layers. The backing layer may contain multiple layers of foam glass bonded together with cement, polymeric foams or other contact adhesives. The tile may also be joined using carbon fibers, polymers, glues, cement, or other adhesives known in the art.

Figure 3A:
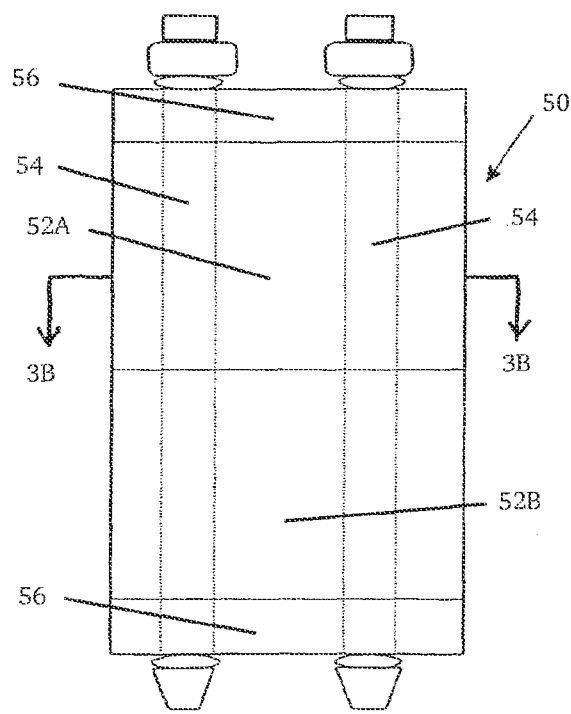
FIG. 3A shows a side view of an embodiment of the present invention with two prestressed foam glass tiles under compression with tension bolts inside the tiles.
Figure 3B:
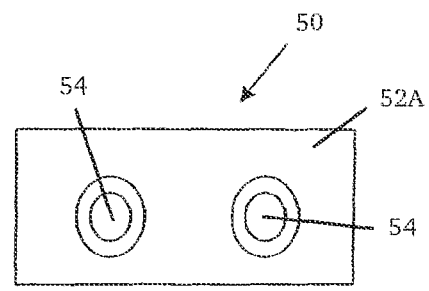
FIG. 3B shows a cross-sectional view taken along line 3B-3B of FIG. 3A.

In FIGS. 3A and 3B, another embodiment of a prestressed assembly 50 made in accordance with the present invention is shown. The prestressed assembly 50 of the FIGS. 3A and 3B is comprised of two prestressed, strong foam glass tile 52A, 52B, two steel beams 56, and two tension bolts 54. FIG. 3A shows a side view of prestressed assembly 50 and FIG. 3B shows a cross-section sectional view of prestressed assembly 50 taken in the middle of tile 52A. Although two prestressed, strong foam glass tiles 52A, 52B are shown in FIGS. 3A and 3B, more or less tiles may be used depending upon the application as discussed above with respect to FIG. 2. As with prior embodiments, it is again important that the top and bottom surfaces of each of the tiles 52A, 52B be even and smooth. Two steel beams 56 are placed on above and below the tiles. The steel beams may also be replaced with other appropriately strong and stiff building materials. These beams are expected to bend as tension is applied. Thus, in order to insure that an even compression distribution is applied to the surfaces of the tiles, one or more steel pieces with beveled edges as discussed above can be used. Alternatively, it is possible to build an appropriate amount of camber into the steel beams based on the anticipated bending. Other techniques well known in the art can also be used to insure that an even compression distribution will be applied to the surfaces of the tiles.

The two steel beams 56 are bolted together by two tension bolts 54 in a manner consistent with the discussion in FIG. 1. However, in this embodiment the tiles are thick enough so that the tension bolts may go through the tiles. One advantage of this embodiment over FIGS. 1 and 2 is that since the tension bolts are within the tiles which are not permeable to fluids, there is less likelihood of said bolts rusting. FIGS. 3A and 3B show two tension bolts going through tiles 52A and 52B. While the number of tension bolts is not critical, it is preferred that the tension bolts be distributed so as to evenly apply the compression strain on the surfaces of the tiles. Alternatively, rather than using tension bolts, it is possible to use as tension members, wires and other such mechanisms well known to those skilled in the art, such as standard and compacted seven-wire prestressing strands as discussed on page 48 of Edward G. Nawy, Prestressed Concrete: A Fundamental Approach (Prentice Hall 1989). Other alternative tension members are also known in the art and may be used, such as carbon fibers such as Kevlar® or other appropriately strong metals.

In FIGS. 4A and 4B, another embodiment of a prestressed assembly 60 made in accordance with the present invention is shown. The prestressed assembly 60 of the FIGS. 4A and 4B is comprised of two sets of prestressed, strong foam glass tiles 62A/62B and 62C/62D, two steel beams 66, and two tension bolts 64A and 64B. FIG. 4A shows a side view of prestressed assembly 60 and FIG. 4B shows a cross-section sectional view of prestressed assembly 60 taken in the middle of tiles 62A and 62C. Although two pairs of prestressed, strong foam glass tiles 62A/62B and 62C/62D are shown in FIGS. 4A and 4B, more or less tiles may be used depending upon the application as discussed above with respect to FIG. 2. As with prior embodiments, it is again important that the top and bottom surfaces of each of the tiles 62A, 62B, 62C and 62D are even and smooth. Two steel beams 66 are placed above and below the tiles. The steel beams may also be replaced with other appropriately strong and stiff building materials. These beams are expected to bend as tension is applied. Thus, in order to insure that an even compression distribution is applied to the surfaces of the tiles, one or more steel pieces with beveled edges as discussed above can be used. Alternatively, it is possible to build an appropriate amount of camber into the steel beams based on the anticipated bending. Other techniques well known in the art can also be used to insure that an even compression distribution will be applied to the surfaces of the tiles.

The two steel beams 66 are bolted together by two tension bolts 64A, 64B in a manner consistent with the discussion in FIG. 1. However, in this embodiment, since there are two sets of tiles, one set comprising tiles 62C/62D forming an inner wall, and one set comprising tiles 62A/62B forming an outer wall, the tension bolts 64A, 64B are threaded between the two sets of tiles. While the number of tension bolts is not critical, it is preferred that the tension bolts be distributed so as to evenly apply the compression strain on the surfaces of the tiles. Other alternatives to the tension bolts are also known in the art as discussed above and may be used instead.

One advantage of using this type of embodiment of assembly 60 is that the front wall and back wall can have different types of surfaces. In particular, since prestressed, foam glass tiles of the present invention are capable of many different type of aesthetic finishes as described in the co-pending application owned by the same applicant discussed above which was filed on the same date as the present application, it is possible for a wall based on this embodiment to have a different outer surface than the inner surface, and there are a wide variety of surfaces that can be selected as discussed above. Another advantage of using this type of embodiment of assembly 60 is that, like the prior embodiment, the tension bolts 64A, 64B is protected against the environment. Further, since there is a built in space between the two walls, wiring, plumbing and other utilities can be built in or brought therethrough. In accordance with this embodiment, the steel beams 66 can have appropriate holes designed in to pass through wiring, plumbing, and other utilities. The foam glass tiles of the present invention are also capable of being cut to provide access holes, without significantly adversely affecting their strength. Alternatively, the empty space can be filled with polymeric foam or other appropriate filler to provide additional insulation, and protection against environmental exposure to the tension bolts and wiring, plumbing and other utilities.

FIGS. 5A and 5B show another embodiment of the present invention where the assembly shown in FIGS. 4A and 4B are further modified by having two tension bolts through the center of the assembly 70 in one direction (e.g., horizontally), and one tension bolt through the center of the assembly 70 in a perpendicular direction (e.g., vertically). The number and placement of the tension bolts used can, of course, be modified. Ideally, the tension bolts should be placed in a fashion to provide an equal strain on the material in opposite directions. It is not necessary that the strain in the vertical direction be the same as in the horizontal direction, but the strain from opposite ends in the vertical direction should be approximately even, as the strain from the opposite ends in the horizontal direction should be approximately even. Each set of tension bolts will have a pair of corresponding steel beams, and related apparatus as described above with respect to the other embodiments of the present invention.

Thus the assembly 70 is comprised of two sets of foam glass tiles 72A/72B/72E etc. and 72C/72D/72F etc. The first set of foam glass tiles can be comprised of more than one column of tiles such as represented by column comprised of tiles 72A and 72B. The first set of foam glass tiles can be comprised of more than one row of tiles such as represented by tiles 72A and 72E. Similarly, the second set of foam glass tiles can be comprised of more than one column and more than one row of tiles. This assembly 70 may be further modified in accordance with the description of the previously assemblies 10, 10A, 50 and 60.

An additional advantage of the embodiment of the present invention represented by assembly 70 in FIGS. 5A and 5B is that different amounts of strain can be applied in the horizontal and vertical direction. As a result of this arrangement, each tile will have biaxial compression which will make its ability to absorb or withstand shock waves more versatile. Another additional advantage of this embodiment is that is possible to make larger panels.

Figure 6:
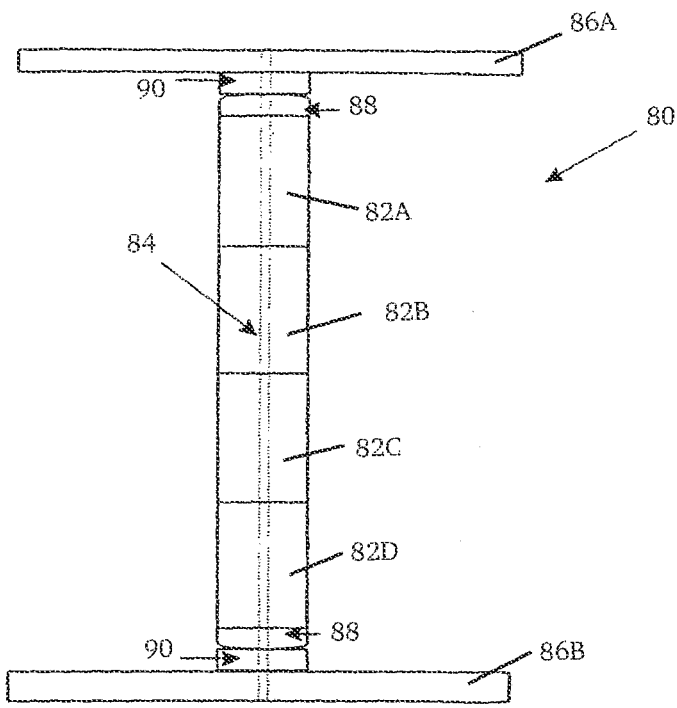
FIG. 6 shows a side view of another embodiment of the present invention where multiple foam glass tiles are under compression between two floors in a building.

In another embodiment of the present invention shown in FIG. 6, the assembly 80 uses two floors 86A and 86B of a building in addition to steel beams 90/steel pieces 88 to achieve the prestressing. Since the weight of the upper floor 86A can be used to apply compression, the initial tension being applied by tension bolt 84 can be reduced. In FIG. 6, four rows of tiles 82A, 82B, 82C and 82D are shown. However, the number and size of tiles can be modified as discussed above. Further this embodiment can be further modified in accordance with the teachings and principles discussed above with respect to embodiments 10, 10A, 50, 60 and 70.

It will be understood by those skilled in the art that the foregoing method of making the tiles and assemblies of the present invention could be modified or other methods of fabrication can be used without departing from the spirit and scope of the invention.

EXAMPLES 1-7

As set forth in the co-pending '071 Application, which is incorporated by reference herein as discussed above, the foam glass tiles in Examples 1-7 of the present application were made by blending the raw materials set forth under Composition in Table 1 below:

In order to make a useful comparison, the weight of the composition was normalized assuming with the total amount of silica plus fly ash equals 100 grams. Thereafter, to insure the proper amount of material is used the normalized composition weight is multiplied by an appropriate batch size factor, as indicated in Table 1, to account for the size of the mold being used. For example, a batch size factor of 50×, has been used for a mold 8 inches×14 inches×4 inches.

The resulting slurry was dried, and the powder mixture was calcined at a temperature between 900° C. and 1100° C., as indicated in the process section of Table 1, for between 5 to 60 minutes, as indicated in the process section of Table 1, to react the raw materials, and decompose sugar to finely, and evenly dispersed carbonaceous phase. The calcined product was ground to fine powders, placed in an Inconel™ mold, and was foamed by heating at a temperature between 750° C. to 900° C., as indicated in the process section of Table 1, and soaked at that temperature for between 10 to 60 minutes, as indicated in the process section of Table 1. The resulting foam glass was annealed to room temperature and de-molded.

The characteristics of the resulting foam glass for Examples 1 to 7 herein are indicated in the characteristics portion of Table 1. The resulting foam glass had a density of about 30 and 70 lb./cu. ft., as indicated in the characteristics section of Table 1, and a completely glazed surface. The pore structure was uniform with average pore sizes as indicated in the characteristics section of Table 1. As Table 1 shows, tiles with smaller pore sizes, high density and uniform structures provided have the greatest tensile and compression strength. In order to determine the strength of the samples of foam glass prepared, an effort was made to follow the standard ASTM testing procedures for concrete. However, because the samples proved to be substantially stronger than concrete, the procedures had to be modified by reducing the size of the samples in order for the equipment used to actually break the samples. Thus, foam glass blocks were cut into cylinders between 1.0 and 1.5 inches in diameter and less than 5 inches tall for compression measurements without the glazed sur-

TABLE 1

| Example | 1 | 2 | 3 | 4 | 5 | 6 | 7 |
|---|---|---|---|---|---|---|---|
| Composition | | | | | | | |
| Silica sand (g) | 80 | 80 | 80 | 80 | 80 | 80 | 50 |
| Fly Ash (g) | 0 | 20 | 20 | 20 | 20 | 20 | 50 |
| $Fe_2O_3$ (g) | 3.4 | | | | | | |
| Sodium Silicate, 5 $H_2O$ (g) | 30 | 30 | 30 | 30 | 25 | 25 | 30 |
| Borax, 5 $H_2O$ (g) | 25 | 15 | 25 | 25 | 30 | 30 | 25 |
| Alumina (g) | 5 | | | | | | |
| Sugar (g) | 2 | 3 | 3 | 3 | 3 | 3 | 2 |
| Water (g) | 25 | 25 | 24 | 25 | 25 | 25 | 25 |
| Batch Size Factor | 20× | 20× | 60× | 40× | 50× | 50× | 20× |
| Process Information | | | | | | | |
| Calcination temp., ° C. | 970 | 970 | 970 | 970 | 970 | 970 | 970 |
| Calcination time, min. | 30 | 30 | 30 | 30 | 30 | 30 | 30 |
| Foaming temp., ° C. | 810 | 800 | 790 | 810 | 795 | 795 | 810 |
| Foaming time, min. | 10 | 10 | 10 | 10 | 10 | 10 | 10 |
| Foaming mesch size | 100 | 100 | 100 | 100 | 100 | 100 | 100 |
| Characteristics | | | | | | | |
| Density (PCF) | 32 | 36 | 41 | 46 | 62 | 65 | 69 |
| Bubbles/cm | 12 | 18 | 12 | 20 | 13 | 18 | 29 |
| Characteristic length (mm) | 0.8 | 0.6 | 0.8 | 0.5 | 0.8 | 0.6 | 0.3 |
| Compression strength (PSI) | 2078 | 2400 | 4300 | 6000 | 10500 | 12500 | 14600 |
| Tension strength (PSI) | 775 | 930 | | 960 | 1250 | 1400 | 2500 |
| Glazed Top Surface (closed pore outer skin) | Yes | Yes | Yes | Yes | Yes | Yes | Yes | face. As indicated in the characteristics portion of Table 1, the compression strength of Examples 5-7 herein were over 10,000 lb./sq. in., a factor of over 2½ times the compression strength of concrete (4,000 lb./sq. in.). Similarly, as indicated in the characteristics portion of Table 1, the tensile strength of Examples 5-7 herein (corresponding to Examples 7-9 of the '071 Application) were over 1250 lb./sq. in., a factor of over 2½ times the tensile strength of concrete (500 lb./sq. in.). Example 7 herein has a tensile strength of 2500 lb./sq. in., a factor of 5 times the tensile strength of concrete.

A composite assembly 10 as shown in FIG. 1 was then built using Example 7. The glass tile formed in Example 7 was cut using a glass cutting saw and ground using a silicon carbide grinder into a block which had a square top surface 32 of 4.52 cm×4.52 cm and a length of 5½ inches between top surface 32 and bottom surface 32. As a result of the cutting and grinding processes, each of the sides were smooth and parallel to the opposite side of the tile 12. The sample was next washed to remove find grind. After drying, strain gauges 14 with wires 16 connected thereto were applied to each side of the tile 12. Wires 16 were connected to strain meters to monitor the deformation of each side of the tile during prestressing. Tension bolts 18 with a diameter of ⅜ inch were threaded through the holes in the steel beams 26, with bolt heads 24 and washers 20 on one side of the lower steel beam 26 shown in FIG. 1 and washers 20 and nuts 22 being connected on the opposite side of the other steel beam 26. The nuts and bolts were left not tightened so as to provide sufficient space for the remaining components of the assembly to be fit therebetween. Steel pieces 28 with their beveled edges facing the inner surfaces of the steel beams 26 were then appropriately placed in the middle of the steel beams. The tile 12 made from Example 7 was then slid between the steel pieces 28 with surfaces 32 adjacent thereto. The alignment was checked and secured to avoid uneven application of strain. Bolt head 24 were held fixed while the nuts 22 were alternatively tightened in a manner to insure approximately even strain in the gauges which were monitored by the meters not shown in FIG. 1. The final monitored strain was 2,500 με.

Figure 7:
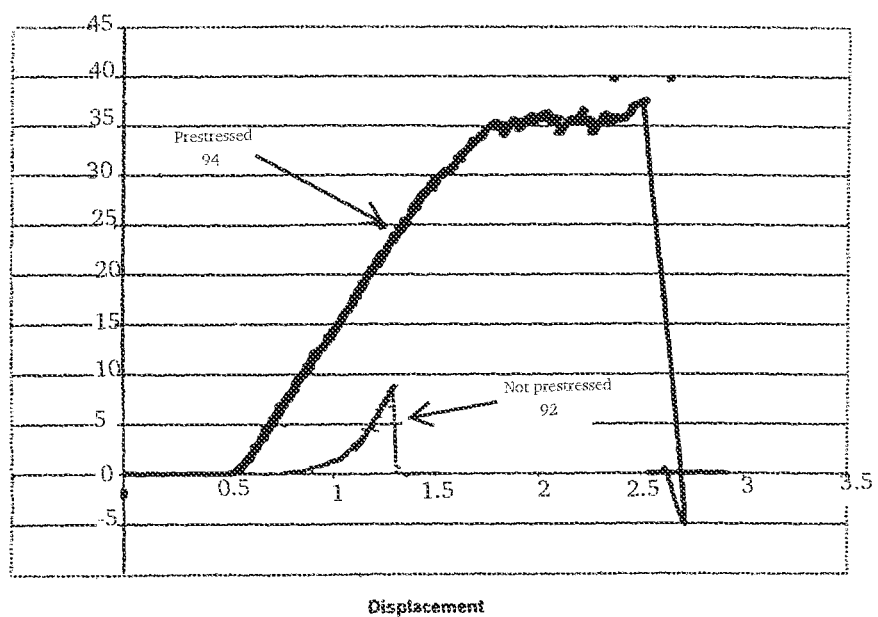
FIG. 7 shows a graph of force as a function of displacement of the three point bending test comparing Example 7 unstressed and an assembly of the present invention using Example 7 prestressed.

One of the tension gauges 14 was removed from a side of the tile 12 which was not covered by a tension bolt. The assembly was then tested for its tension strength by placing the opposite side of tile 12 on two knife edges (i.e., rounded cylinders), with a third knife edge being placed in the top center of the side where the tension gauge 14 was removed. The tension bolts remained on the other two sides of tile 12. A constant rate of displacement was then applied on the top knife edge, and the resulting force was measured. The same type of analysis was also performed on another piece of Example 7 which was 1.58 cm×4.76 cm surface and the results were compared. FIG. 7 shows a graph of the force as a function of displacement of the three point bending test comparing Example 7 unstressed (see curve 92) and an assembly of the present invention using Example 7 prestressed (see curve 94). The different dimensions of the samples were accounted for by using equation (1) as follows:

$$F_{2, rescaled} = F_2(w_1/w_2)(h_1/h_2)^2 \qquad (1)$$

where $F_{2, rescaled}$ is the rescaled Force, $F_2$ is the measured force, $w_1$ is the width of sample 1, $w_2$ is the width of sample 2, $h_1$ is the height of sample 1, and $h_2$ is the height of sample 2.

Significantly, as can be seen from FIG. 7, the area under the curve 94 associated with the prestressed sample was 35 times larger than the area under the curve 92 associated with the unprestressed sample. This demonstrates a extremely large resistance to shock waves of the type that may be associated with either an explosion, earth quake or other intense shock wave. Similarly, the amount of force which the prestressed sample withstood was 35 kN, as compared to the unprestressed sample which absorbed less than 10 kN. As a result of this substantially greater force applied prior to failure, a lighter more compact material may be used to withstand a greater force. This demonstrates a very strong material. The desired strain pattern can be designed to accommodate a particular application as is consistent with methods used by those skilled in the art.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A prestressed foam glass tile wherein said tile has a compression strength of 10,000 psi or greater prior to being in a prestressed condition and a prestress compression of 4,000 psi or greater.

2. The prestressed foam glass tile of claim 1, wherein said prestress compression is 5000 psi or greater.

3. The prestressed foam glass tile of claim 1, wherein a tension member is under tension outside of said prestressed foam glass tile to provide said prestress compression.

4. The prestressed foam glass tile of claim 3, wherein said tension member is comprised of a tension bolt.

5. A prestressed assembly for use in buildings or other structures comprising:
   at least one prestressed foam glass tile, having a compression strength of 10,000 psi or greater prior to being in a prestressed condition and a prestress compression of 4,000 psi or greater;
   at least two metal beams; and
   one or more tension members
   wherein said at least one prestressed foam glass tile is placed between said at least two metal beams and held in compression of at least 4,000 psi by said one or more tension members.

6. The prestressed assembly of claim 5, wherein said prestress compression of said at least one prestressed foam glass tile is 5000 psi or greater.

7. The prestressed assembly of claim 5, wherein said assembly is a column in a building.

8. The prestressed assembly of claim 5, wherein said metal beams are comprised of steel.

9. The prestressed assembly of claim 5, wherein said one or more tension members are comprised of tension bolts.

10. The prestressed assembly of claim 5, wherein said one or more tension members are not within said at least one prestressed foam glass tile.

11. A prestressed foam glass tile wherein said tile has a prestress compression of 4,000 psi or greater and an average pore size of 1.0 mm or less, wherein said average pore size is measured based on the distance between two farthest points of pore surface.

12. The prestressed foam glass tile of claim 11, wherein said average pore size is 0.7 mm or less.

13. The prestressed foam glass tile of claim 11, wherein said average pore size is 0.6 mm or less.

14. The prestressed foam glass tile of claim 11, wherein said average pore size is 0.5 mm or less.

15. The prestressed foam glass tile of claim 11, wherein said average pore size is 0.4 mm or less.

16. The prestressed foam glass tile of claim 11, wherein said average pore size is 0.3 mm or less.

17. The prestressed foam glass tile of claim 11, wherein said prestress compression is 5000 psi or greater.

18. The prestressed foam glass tile of claim 11, wherein a tension member is under tension outside of said prestressed foam glass tile to provide said prestress compression.

19. The prestressed foam glass tile of claim 18, wherein said tension member is comprised of a tension bolt.

20. A prestressed assembly for use in buildings or other structures comprising:
- at least one prestressed foam glass tile, having a prestress compression of 4,000 psi or greater, and an average pore size of 1.0 mm or less, wherein said average pore size is measured based on the distance between two farthest points of pore surface;
- at least two metal beams; and
- one or more tension members wherein said at least one prestressed foam glass tile is placed between said at least two metal beams and held in compression of at least 4,000 psi by said one or more tension members.

21. The prestressed assembly of claim 20, wherein said average pore size of said at least one prestressed foam glass tiles is 0.7 mm or less.

22. The prestressed assembly of claim 20, wherein said average pore size of said at least one prestressed foam glass tiles is 0.6 mm or less.

23. The prestressed assembly of claim 20, wherein said average pore size of said at least one prestressed foam glass tiles is 0.5 mm or less.

24. The prestressed assembly of claim 20, wherein said average pore size of said at least one prestressed foam glass tiles is 0.4 mm or less.

25. The prestressed assembly of claim 20, wherein said average pore size of said at least one prestressed foam glass tiles is 0.3 mm or less.

26. The prestressed assembly of claim 20, wherein said prestress compression of said at least one prestressed foam glass tile is 5000 psi or greater.

27. The prestressed assembly of claim 20, wherein said metal beams are comprised of steel.

28. The prestressed assembly of claim 20, wherein said one or more tension members are comprised of tension bolts.

29. The prestressed assembly of claim 20, wherein said one or more tension members are not within said at least one prestressed foam glass tile.

* * * * *